Patented Sept. 8, 1931

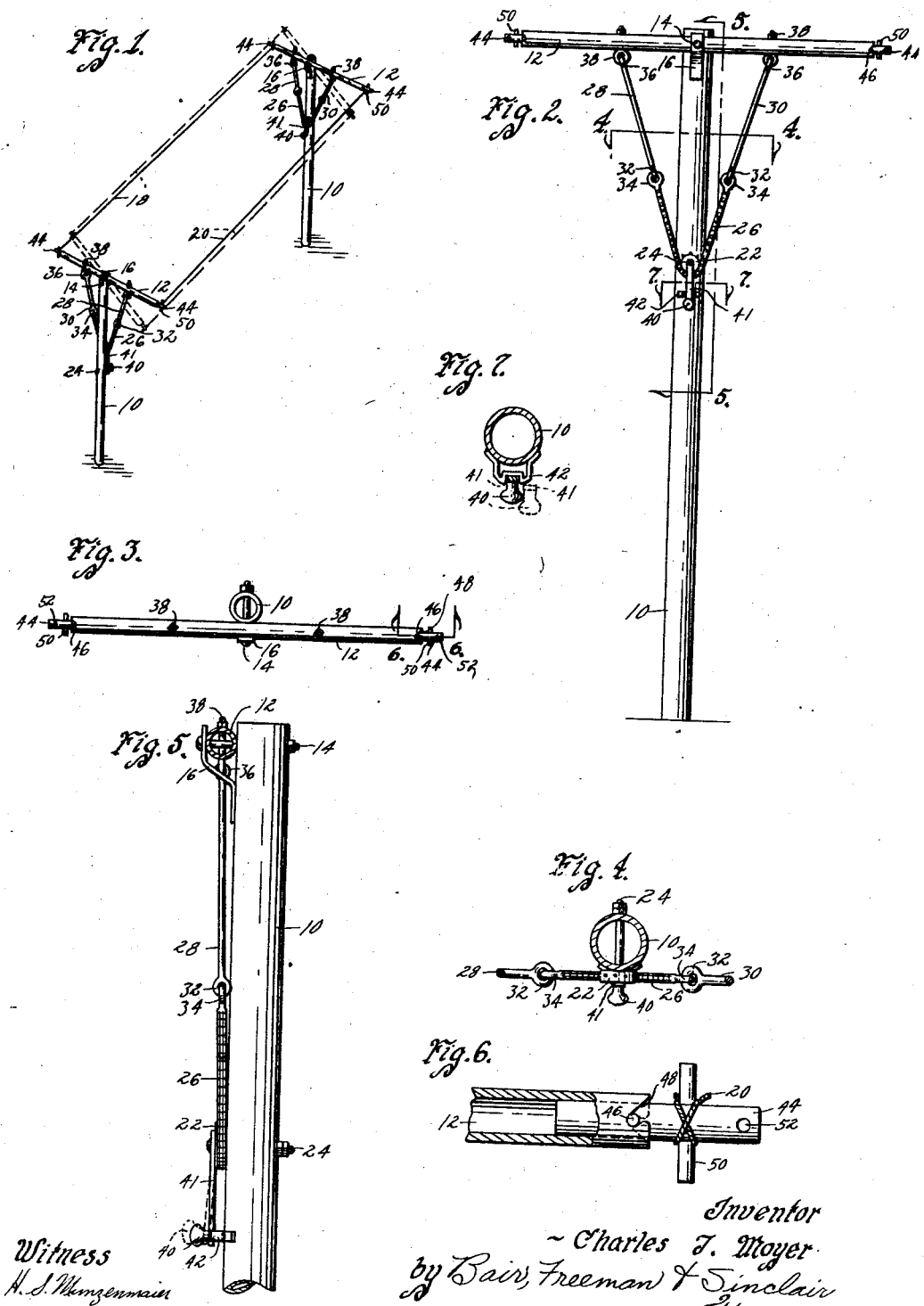

1,822,364

UNITED STATES PATENT OFFICE

CHARLES T. MOYER, OF GARWIN, IOWA

CLOTHESLINE SUPPORT

Application filed July 3, 1930. Serial No. 465,581.

The object of this invention is to provide an improved support for clotheslines whereby the lines may be lowered for convenience in attaching or removing clothes and then raised to their normal elevated positions while the clothes are drying.

A further object of the invention is to provide an improved clothesline support including a pair of spaced posts each carrying a pivotally mounted cross arm to which one end of a clothesline is attached, novel means also being provided for swinging the cross arms on their pivots and for holding them in any one of several elevated positions.

A further object is to provide improved means arranged for manual actuation for moving the pivoted cross arms to different selected positions.

Still another object of the invention is to provide means for tightening a clothesline or the like.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view showing a pair of clothesline posts each carrying a pivoted cross arm for supporting the ends of two parallel lines in accordance with my invention.

Figure 2 is an elevation illustrating one of the posts and its cross arm and operating means.

Figure 3 is a plan view of the same.

Figure 4 is a horizontal section on the line 4—4 of Figure 2.

Figure 5 is a vertical section on the line 5—5 of Figure 2.

Figure 6 is a detail section on the line 6—6 of Figure 3 illustrating particularly the line tightening means.

Figure 7 is a horizontal section on the line 7—7 of Figure 2, illustrating particularly the latching means.

On the accompanying drawings I have employed the numeral 10 to designate each of a pair of spaced posts which may be suitably mounted in upright position.

Each post 10 carries at its upper end a cross arm 12 which is pivotally supported at a point midway between its ends by a bolt 14 extending through the post and arm and through a clevice 16 carried by said arm.

The two cross arms 12 are normally arranged in horizontal position and serve to carry and support in any substantial manner a pair of spaced clotheslines designated by the numerals 18 and 20.

A sprocket gear 22 is mounted for rotation on each post 10 at a point suitably spaced below the pivot 14 and the cross arm on such post. In this instance the sprocket gear 22 is carried by a bolt or spindle 24 extending transversely through the post.

A sprocket chain 26 is arranged to engage beneath and partially embrace each sprocket gear 22, the ends of said chain being extended upwardly toward the cross arm 12 and being connected thereto by any suitable means such as a pair of links 28 and 30. The links are formed at their lower ends with eyes 32 engaging in eyes 34 carried by the respective ends of the chain 26. The upper ends of the links are formed with eyes 36 engaging the eyes of eye bolts 38 mounted through the cross arm 12 at the points on each side of and substantially spaced from the pivot point 14.

A crank handle 40 is fixed to and projects laterally from each sprocket gear 22 and is adapted for manual actuation to turn said sprocket gear and to thereby cause the chain 26 to travel in one direction or the other for swinging the cross arm 12 on its pivot whereby one end of the said arm will be raised and the other will be lowered.

Any suitable means may be employed for holding the sprocket gear 22 in the desired position. According to the embodiment of my invention the crank arm 41 is made of resilient material and is adapted to engage near its free end in a notched latching member 42 carried by the post 10 at a point below the sprocket gear.

In the normal position of the parts the cross arms 12 are arranged horizontally and the lines 18 and 20 are held thereby in substantially the same horizontal plane. In this position the central portion of the chain 26 engages the sprocket 22 and the parts are held in this position by the downwardly extending crank arm 41 engaging in the notch of the latch member 42.

When it is desired to lower one of the lines, such as 20, for convenience in attaching or removing clothes, the cranks 41 are successively turned through an arc for rotating the sprockets 22 and causing the chains 26 to travel thereon. By this means a downward pull is exerted through the chain 26 and one of the links such as 30 for causing the arm 12 to swing on its pivot.

It should be noted that the crank arm 41 may be sprung away from the post 10 and out of engagement with the latch member 42 because of its inherent resilience and the parts preferably are so arranged that a half-turn of the crank and sprocket gear, or namely a rotation through 180 degrees, will cause the cross arm to assume the desired position for convenience in attaching or removing clothes. When this half turn has been completed the crank arm 41 will again engage the latch member 42 and will thus serve to hold the parts in the adjusted position as indicated by dotted lines in Figure 1.

When the desired operation has been performed with reference to the line 20, the crank 41 of each supporting post may again be manipulated for raising the arms 12 and the line 20 to substantially horizontal position. If it is also desired to attach or remove clothes relative to the other line 18, this turning movement may be continued through another arc of 180 degrees in the same direction, whereby the line 18 will assume a lowered position and after that the operation may be reversed for placing both arms and both lines in horizontal position.

It is obvious that I have provided a simple and convenient means for alternately or selectively lowering and raising the two lines carried by the pivoted cross arms and for holding them either in lowered, elevated or normal horizontal position.

The cross arm 12 on each post preferably is of tubular form and may consist of a suitable length of metallic pipe and the posts 10 may also be of tubular form if desired.

I have also provided means for quickly and effectively tightening the lines such as 18 and 20 so that they may always be kept taut if desired or may be loosened somewhat when not in actual use.

For this purpose I have provided a mechanism which is shown in Figure 6 and it includes a spindle 44 which is rotatably mounted in and projects somewhat from the open end of the tubular cross arm 12.

It is to be understood that one of the spindles 44 may be mounted in each end of each of the cross arms.

Each spindle 44 is provided with one or more radially projecting stubs 46 adapted to be received in a backwardly inclined notch 48 opening to the end of the cross arm 12.

An end portion of one of the lines, such as 20, may be attached in any suitable manner to the projecting portion of the spindle 44 and in Figure 6 I have shown the line as being wrapped around the spindle and about the ends of a pin 50 extending through it, whereby the line may be secured attached without the tying of knots.

When it is desired to tighten one of the lines, the spindle 44 at one of its ends may be manually turned rearwardly or in a direction away from the other supporting post and arm. This may be accomplished by engaging the pin 50 by hand or by a wrench, or by extending a separate pin, not shown, through a transverse hole 52 formed in the outer end of the spindle. In turning the spindle, the studs 46 are caused to move out of the inclined notches 48 in which they are normally seated and when the tightening movement has been accomplished, the spindle 44 is pushed inwardly toward the arm 12 and the studs 46 are again caused to enter the notches 48 for maintaining the tightened condition. It will be understood that this engagement of the studs 46 in the notches 48 serves to prevent reverse movement of the spindle 44.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. In a clothesline support, a post, a cross arm pivotally supported thereon on a horizontal axis and adapted to carry one end of a line, and means for swinging said arm including a sprocket gear rotatably mounted on the post, a hand crank for rotating said gear, a chain engaging said gear, and connections between the respective ends of said chain and points on said arm on opposite sides of the pivot.

2. In a clothes line support, a post, a cross arm pivotally supported thereon on a horizontal axis and adapted to carry one end of a line, and means for swinging said arm including a sprocket gear rotatably mounted on the post, a hand crank for rotating said gear, a chain engaging said gear connections between said chain and points on said arm on opposite sides of the pivot, and means for holding said gear against rotation.

3. In a clothesline support, a post, a cross arm pivotally supported thereon on a horizontal axis and adapted to carry one end of a line, and means for swinging said arm including a sprocket gear rotatably mounted on the post, a hand crank for rotating said gear, a chain engaging said gear, and means for connecting the ends of said chain to points on opposite sides of the pivot of said cross arm.

4. In a clothesline support, a post, a cross arm pivotally supported thereon on a horizontal axis and adapted to carry one end of a line, and means for swinging said arm including a sprocket gear rotatably mounted on the post, a hand crank for rotating said gear, a chain engaging said gear, means for connecting the ends of said chain to points on opposite sides of the pivot of said cross arm, and latch means on said post for engaging the hand crank to hold the gear and cross arm in selected positions of adjustment.

5. In a clothesline support, a post, a cross arm pivotally supported thereon on a horizontal axis and adapted to carry one end of a line, and means for swinging said arm including a sprocket gear rotatably mounted on the post, a hand crank for rotating said gear, a chain engaging said gear, eye bolts in said cross arm on opposite sides of its pivot, and links connected said eye bolts to the respective ends of said chain.

6. In a line support, a tubular member open at its end, a spindle loosely received within and projecting from the end of said member, said member being formed at its end with an inclined notch, a stud on said spindle adapted to enter said notch to prevent reverse rotation of the spindle, and a line attached to said spindle and adapted to be wound thereon.

7. In a line support, a tubular member open at its end, a spindle loosely received within and projecting from the end of said member, means for rotating said spindle, said member being formed at its end with an inclined notch, a stud on said spindle adapted to enter said notch to prevent reverse rotation of the spindle, and a line attached to said spindle and adapted to be wound thereon.

8. In a line support, a tubular member open at its end, a spindle loosely received within and projecting from the end of said member, a pin mounted transversely through the projecting portion of said spindle for convenience in attaching a line thereto and also for manually rotating the spindle to wind or unwind the line relative thereto, said member being formed at its end with an inclined notch, a stud on said spindle adapted to enter said notch to prevent reverse rotation of the spindle.

Des Moines, Iowa, June 16, 1930.

CHARLES T. MOYER.